Sept. 28, 1965 W. S. REYNOLDS 3,209,262

SINGLE TUBE TRANSMITTER EMPLOYING CODED RELAXATION-TYPE OSCILLATOR

Filed Dec. 21, 1961

Willard S. Reynolds

INVENTOR.

BY Clarence A. O'Brien and Harvey B. Jacobson

Attorneys

United States Patent Office 3,209,262
Patented Sept. 28, 1965

3,209,262

SINGLE TUBE TRANSMITTER EMPLOYING CODED RELAXATION-TYPE OSCILLATOR

Willard S. Reynolds, Hollywood, Fla., assignor to Telectron Company, Division of Elliott & Evans, Inc., Fort Lauderdale, Fla.

Filed Dec. 21, 1961, Ser. No. 161,125
4 Claims. (Cl. 325—169)

This invention relates to a transmitter of radiant signal energy capable of simultaneously transmitting coded information at three different control frequencies including a single carrier frequency for radiation of the signal energy.

A primary object of the present invention is to provide a single tube circuit of a novel arrangement operative to transmit an oscillating carrier signal at a selected radio frequency modified in accordance with a coded signal function of low frequency or repetition rate, the coded signals being radiated at controlled intervals constituting a third signal function.

In accordance with the foregoing object, the resultant signal output of the transmitter circuit displays keying characteristics suitable for remote control equipment where discrimination is necessary. Furthermore, the controlled radiation interval feature enables the transmission of radiant energy to occur only at predetermined short intervals so as not to interfere with authorized broadcasts.

Another object of the present invention in accordance with the foregoing objects, is to provide a transmitter capable of accomplishing the aforementioned purposes through the use of a single current controlling device such as a triode vacuum tube. Signal receiving equipment may accordingly be constructed so as to function only when all three of the code frequencies aforementioned are satisfied.

The simultaneous transmission of coded signal functions occurs at a carrier frequency in the radio frequency range having a wave form characterized by a low frequency signal component superimposed upon the carrier signal component while radiation interruptions occur in accordance with the third signal characteristic. As a result thereof, a radiating device of the present invention may be made to operate with a companion receiver device transmitting signals at a large number of possible code combinations without interference from other radiating sources.

The single tube transmitter of the present invention therefore involves an oscillator circuit including a resonant tank circuit connected to the anode of the triode tube and regeneratively coupled to the grid element of the tube so as to sustain oscillations in the tank circuit at resonant frequency which is adjusted within the radio frequency range. A positive potential source is therefore connected to the tank circuit through suitable inductive impedances for periodic supply of energy thereto. Also, the triode tube is maintained conductive by use of a separate energizing circuit for the cathode. In order to alter the wave form of the radio frequency oscillations produced in the tank circuit, a modifying circuit is inductively coupled to the inductance which couples the positive potential source to the tank circuit. The modifying circuit is therefore also connected to the grid of the triode for varying therethrough the conductance of the triode. The modifying signal circuit is therefore arranged produce a current component superimposed on the carrier signal varying at a relatively low frequency value. Finally, a high capacity capacitor circuit couples the modifying circuit to the grid of the triode so that a grid bias path is completed for no more than one second intervals during which periods oscillations are sustained within the tank circuit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
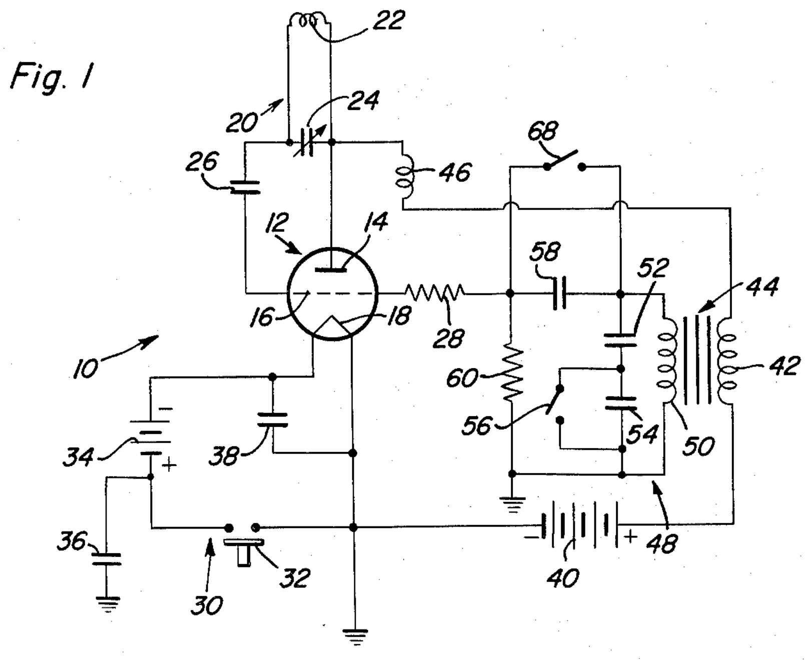
FIGURE 1 is a circuit diagram of the transmitter circuit of the present invention.

Referring now to the drawings in detail, the transmitter circuit illustrated in FIGURE 1 and generally referred to by reference numeral 10 includes a single triode tube generally referred to by reference numeral 12. The tube 12 accordingly includes an anode or plate element 14, a grid 16 and a cathode filament 18. Connected to the anode 14 is a resonant tank circuit generally referred to by reference numeral 20 which includes an inductance 22 across which there is connected a tuning capacitor 24. The tank circuit 20 is operatively connected to the grid 16 through a blocking capacitor 26 which is arranged to prevent the tank circuit from short-circuiting the bias applied to the grid 16. Also connected to the grid 16 is a grid resistor 28 through which a biasing potential is maintained on the grid in order to produce oscillations in the tank circuit 20 at resonant frequency determined by the values of the inductance 22 and the tuning capacitor 24. The foregoing arrangement thus constitutes a tuned-plate oscillator with a capacitive feedback coupling to the grid.

Inasmuch as oscillations are sustained within the tank circuit for short predetermined intervals of time in accordance with the present invention, a separate energizing circuit 30 is provided for heating the cathode filament 18 constantly when the filament energizing switch 32 is closed. A filament battery 34 is therefore provided with one terminal thereof grounded through the capacitor 36 and the other terminal being connected to the grounded filament 18. A protective capacitor 38 is therefore connected across the heater filament 18.

A positive source of potential in the form of battery 40 is operatively connected to the tank circuit 20 through the primary winding 42 of transformer 44 and the radio frequency choke coil 46 connected in series therewith by means of which radio frequency current is isolated from the grid bias. The positive source of potential 40 is thereby operative to periodically supply energy to the tank circuit in order to sustain oscillations therein. However, in order to vary the grid bias in addition to the variation therein effected by the regenerative coupling between the tank circuit 20 and the grid, a modifying signal circuit generally referred to by reference numeral 48 is provided operative to intermittently amplify and suppress oscillations at a repetition rate much lower than the oscillation frequency unlike the operation of the usual blocking oscillator.

The modifying signal circuit 48 includes therefore the secondary winding 50 of the transformer 44 by means of which it is inductively coupled to the primary winding 42. Connected across the secondary winding 50 are shunt capacitors 52 and 54. The low frequency variation in the voltage induced in the signal circuit 48, will therefore be dependent upon the values of the capacitors 52 and 54 and the turn ratio between the primary and secondary windings of the transformer 44. The audio frequency characteristic of the modulating signal circuit 48 may therefore be selectively varied by closing of a shorting switch 56 to bypass the capacitor 54.

The modifying signal voltage from the signal circuit 48 is therefore applied to the grid 16 through the resistor 28 in order to vary the grid bias as hereinbefore indicated. However, the output of the signal circuit is coupled to the grid 16 through a capacitor 58 of relatively high capacity which is shunted through the resistor 60 to ground. When the capacitor 58 is in a discharge state, it offers low resistance to the grid return through the resistor 28 so that all conditions are present for sustained operation in the tank circuit. After a period of time however during operation of the device, the capacitor 58 becomes charged to a level to negatively raise the potential of the grid element 16 so as to block conduction through the triode 12. The triode tube thus remains in its cutoff state until the capacitor 58 has sufficiently discharged through the resistor 60 in order to permit oscillations to resume once again. Thus, the duration and frequency during which oscillations occur in the tank circuit, will be governed by the value of the capacitor 58 and the resistor 60.

Figure 2:
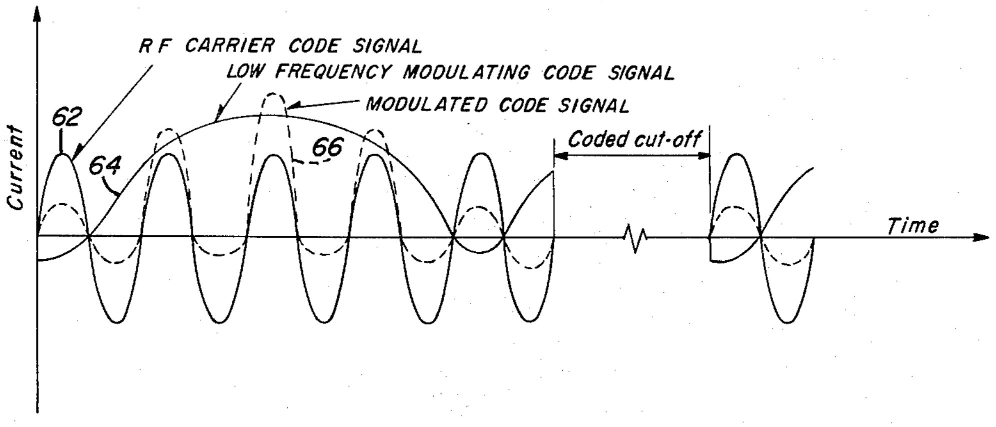
FIGURE 2 is a graphical illustration of typical oscillating current curves that may characterize the oscillations produced in the tank circuit of the transmitter device.

From the foregoing description, it will become apparent that a radio frequency carrier signal such as indicated by curve 62 in FIGURE 2, will be sustained in the tank circuit 20 at a resonant frequency dependent upon the value of the inductance 22, blocking capacitor 26 and the grid resistor 28. Superimposed upon this carrier signal, is a low frequency signal such as illustrated by the curve 64, the frequency of which is determined by the tuning of the transformer 44 and the values and selective placements of the capacitors 52 and 54. The transformer 44 may accordingly be tuned for frequency selection purposes. At the beginning of an operating period, the triode 12 will begin to conduct and subsequently oscillate at the resonant frequency aforementioned. During the rise in current, which is caused to flow through the transformer primary 42, a voltage of opposite direction is induced in the secondary 50. The induced voltage in the secondary will accordingly cause an increased positive change in the grid bias so as to increase conduction through the triode. The radio frequency oscillations are therefore expanded to a higher amplitude as indicated in FIGURE 2. At a point where maximum current is flowing and no longer rising in the transformer primary 42, the induced voltage on the secondary 50 will begin to decline and the voltage applied to the grid will fall toward the negative region. With this change, the triode begins to become less conductive so as to further reduce the current in the transformer primary operatively connected to the tank circuit. The grid bias is therefore further reduced to the negative region until cutoff of the tube is approached at the end of the decline period of the induced voltage in the secondary 50. Thereafter, the tube conduction increases once again and another cycle is begun. As seen in FIGURE 2, the code signal curve 66 is produced which will be characterized by both a high frequency signal component and a superimposed signal component 64 of low frequency. The third signal characteristic in the form of interruptions in the radiated signal, is accomplished through use of the capacitor 58 and resistor 60 as aforementioned. The capacitor 58 may therefore be shorted out by selective closing of the switch 68 so as to permit uninterrupted operation of the transmitter for frequency measuring or tuning purposes.

From the foregoing, it will become apparent that the principles of the present invention may be applied in order to simultaneously produce radio frequency carrier signals. A lower frequency signal component will appear in the radio frequency signal envelope as a modulation suitable for remote control equipment reception and detection. Furthermore, the controlled interruptions of the signals in addition to providing a third code factor, may also render operation of the transmitter equipment lawful under the Federal Communication Rules by reducing the signal energy output of the transmitter to specified short intervals so as not to interfere with regular broadcasting.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

1. A single tube oscillator circuit for radiating signal energy having three simultaneously controlled signal frequency functions comprising, a constantly energized current controlling device having a current conducting electrode and a biasing electrode, resonant tank circuit means operatively connected to said current conducting electrode and said biasing electrode for sustaining a carrier signal current at a high frequency, modifying circuit means inductively coupled to said tank circuit means for controlling said biasing electrode to produce a lower frequency current component superimposed on the carrier signal current, and interrupting circuit means operatively connecting said modifying circuit means to said biasing electrode through a bias current path periodically rendering the current controlling device nonconductive for a predetermined duration for interrupting radiations from the tank circuit means at a lowest frequency, said interrupting circuit means including a capacitor connected in series with the biasing electrode establishing said bias current path between the modifying circuit means and the biasing electrode for a limited interval when in a discharge state, and a discharge resistor connected in shunt relation between the capacitor and the biasing electrode for regulating the period during which the capacitor is charged to predetermine said duration of radiation interruption.

2. A transmitter for radiating signal energy at three simultaneously controlled code functions comprising, an electron flow controlling device having a conducting electrode and a control electrode, resonant circuit means regeneratively coupling said conducting electrode to said control electrode to effect generation of oscillations at a first coded frequency, inductance means operatively connecting said resonant circuit means to a positive source of potential, modifying means inductively coupling said inductance means to said control electrode for varying the conductance of said electron control device to superimpose a current component on said oscillations at a second coded frequency, and means responsive to the supply of said current component to the control electrode for periodically rendering the electron flow controlling device non-conductive at a third coded frequency and for a predetermined duration, said latter means including a capacitor connected in series between said modifying means and the control electrode for establishing a current blocking bias on said control electrode and a discharge resistor connected in shunt relation between the capacitor and the control electrode for regulating discharge from said capacitor to limit said current blocking bias to said predetermined duration.

3. A code modified radio frequency transmitter comprising, a current controlling device having a control electrode and a pair of current conducting electrodes, means for establishing potentials of opposite polarities on said current conducting electrodes for conduction therebetween, a radio frequency tuned circuit coupled to one of said pair of current conducting electrodes, means for applying a feedback voltage from said radio frequency tuned circuit to said control electrode to sustain a radio frequency signal during conduction, a selectively tuned circuit coupled to said one of the current conducting electrodes, means for applying a selectively controlled feedback voltage from said selectively tuned circuit to said control electrode whereby said radio frequency signal of said radio frequency tuned circuit is amplified and suppressed at a repetition rate of audio frequency value and means responsive to said selectively controlled feedback voltage for periodically biasing the control electrode to a condition blocking conduction at a frequency lower than said audio frequency including a capacitor connected to said feedback voltage applying means for charging thereof, means coupling said capacitor to the control electrode for conducting bias current through the capacitor when in a discharged state, and a discharge resistor connected in shunt relation to the capacitor for regulating the period during which the capacitor is charged to block and conduction through the current controlling device.

4. In combination with a current controlling device having an output electrode connected in a tuned output circuit and a control electrode having a feedback connection to the tuned output circuit for sustaining oscillations therein at a carrier code frequency when the current controlling device is in a conductive state; means responsive to a feedback voltage applied therethrough to the control electrode for periodically biasing the current controlling device to a non-conductive state at an intermittent interruption code frequency, and selectively tuned inductive means operatively coupled to the tuned output circuit for applying said feedback voltage to the control electrode to amplify and suppress said oscillations at a repetition code frequency that is greater than said interruption frequency and less than the carrier frequency of said oscillations, whereby three coded functions are available in the signal radiated by the output circuit, said feedback voltage responsive means including a capacitor connected in series between the control electrode and the tuned inductive means for establishing a current blocking bias on said current controlling device, and a discharge resistor connected in shunt relation between the capacitor and the control electrode for regulating the period during which the capacitor is charged by said feedback voltage to hold the current controlling device in said non-conductive state for a predetermined duration.

References Cited by the Examiner

UNITED STATES PATENTS

| | | | |
|---|---|---|---|
| 2,991,357 | 7/61 | True | 331—117 |

FOREIGN PATENTS

| | | |
|---|---|---|
| 187,457 | 10/22 | Great Britain. |
| 581,782 | 10/46 | Great Britain. |

OTHER REFERENCES

Cruft Electronics Staff: "Electronic Circuits ana Tubes," McGraw-Hill, 1947, pp. 804–809.

DAVID G. REDINBAUGH, *Primary Examiner.*